Dec. 11, 1951  A. E. BACCEI ET AL  2,577,993
DISK HARROW SQUAD HITCH
Filed June 27, 1947
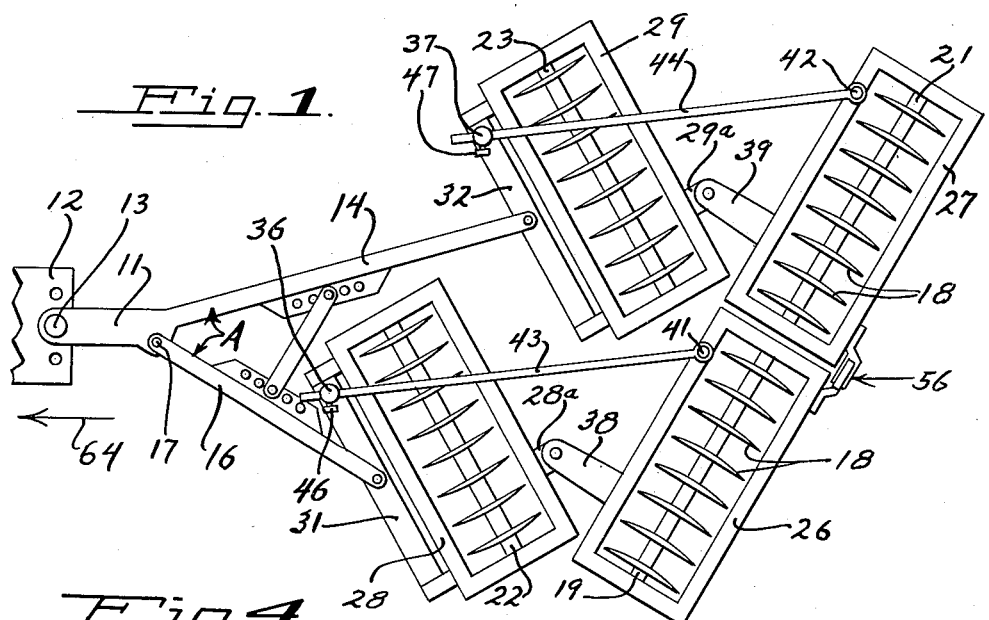
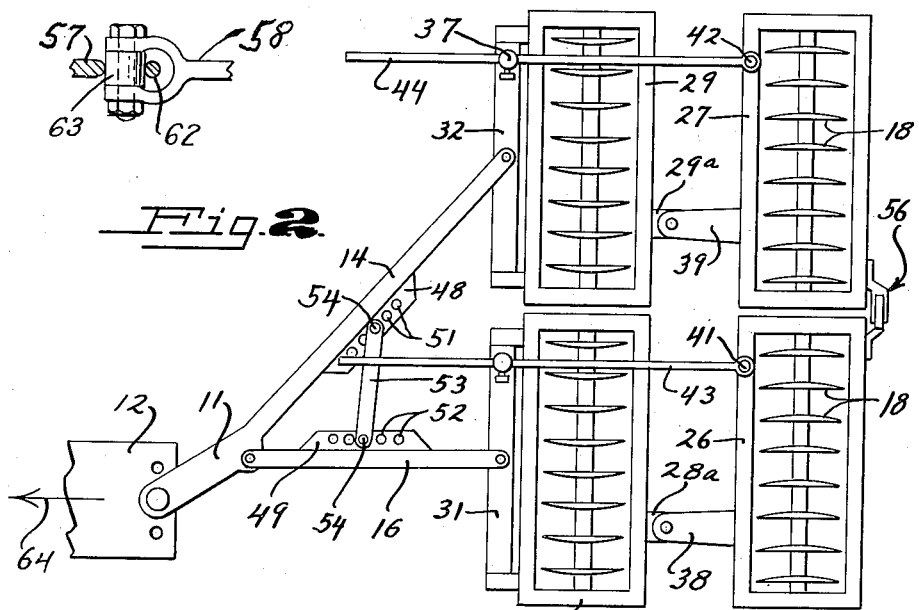
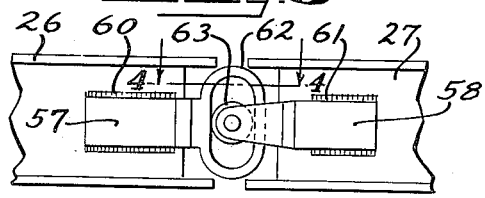
INVENTORS
ALDO E. BACCEI
GUIDO F. BACCEI
BY
Stephen S. Townsend
ATTORNEY.

Patented Dec. 11, 1951

2,577,993

UNITED STATES PATENT OFFICE 2,577,993

DISK HARROW SQUAD HITCH

Aldo E. Baccei and Guido F. Baccei,
Woodland, Calif.

Application June 27, 1947, Serial No. 757,582

3 Claims. (Cl. 55—83)

This invention relates to devices for harrowing or disking the earth in preparing it for agricultural or other purposes, and it relates more particularly to hitches for coordinating a multiplicity of sets of harrows with relation to each other and to the draft device. Disk harrows are conventionally made up in sets of parallel disks on a common shaft and within a frame, the whole such unit being conventionally known as a set. A squadron or squad consists of a plurality of such sets with the disks of a set arranged at an angle to the disks of another set. The number of sets is generally four and the invention will be described with respect to such a number.

Objects of this invention are to provide a hitch, which is simple in construction and yet durable; and also to provide a hitch which will permit of easily making the disk sets parallel to each other to permit of easy transportation, for example, to the barn or to the field, while at the same time permitting making a turn to the right or to the left without the use of a steering arm. Further objects of this invention are to provide a hitch which is well adapted for four sets of disks with two sets in the rear and in line with each other and two forward which are parallel to, but not in line with, each other and at an angle to the rear ones; to provide a hitch which will cause all sets to be parallel to each other when the pull on the hitch is reversed, in order to ease transportation and to remove debris from the disks; to provide a hitch which is simple in structure and functions better than heretofore with four disk sets arranged as previously explained; to provide a hitch by which the disk sets can be operated at any desired angle without the necessity of making any major change in the set-up; to provide a hitch which permits backing up without entangling or interlocking sets of disks; and to provide a hitch which can be easily and quickly attached and dismantled. A further object of the invention is to provide a pivotal connection between sets of disks to allow vertical and horizontal movement therebetween.

Other objects and advantages of this invention will be apparent on reading this specification. The accompanying drawings form a part of this specification and illustrate the preferred embodiment of the invention.

Referring to the drawings:

Fig. 1 is a top, plan view of the novel hitch and disk harrow sets in operative relation for working the ground.

Fig. 2 is a similar view with the disks parallel to each other and to the line of draft, as when they are being moved to or from the locus of work.

Fig. 3 is a horizontal elevation of the connection between the rear disk sets.

Fig. 4 is a sectional view, taken on line 4—4 of Fig. 3.

Referring to the drawings, 11 is a bar for drawing the hitch and the disks. This bar may be attached to a drawbar 12 of a tractor or other draft vehicle (not shown). The attachment may be made by means of coupling pin 13 passing through registering holes in the members 11 and 12 or in any other suitable way. The hitch has a right leg 14, which is at a fixed angle to the bar 11. The hitch has a left leg 16, which is pivoted to the bar 11, by a pin 17, at a point adjacent to the angle formed by the members 11 and 14. The right leg 14 is bent, as aforementioned, to form a fixed angle relative to the bar 11. We have discovered that the leg 14 should be disposed at an angle of, preferably, 28° to 32° decreased relative to the longitudinal axis of the bar 11 in order to obtain maximum results. The critical range of angularity is from 25° to 38°.

Disks 18 of each set may be arranged for rotation about axes 19, 21, 22 and 23, each of which is common to its own set and is supported in frames 26, 27, 28 and 29, respectively. The frames 28 and 29 carry, respectively, members 31 and 32 firmly attached thereto along the front sides thereof. The leg 16 is pivotally attached at its end to the center of the member 31. The leg 14 is pivotally attached at its end to the center of the member 32. The leg 14 is longer than the leg 16 so that the frames 28 and 29 can assume the positions shown in Fig. 1. The frames 28 and 29 carry lugs 28ª and 29ª, respectively, which are to the left of the central cross section of the frame.

Pivoted to the lugs 28ª and 29ª are longer lugs 38 and 39, respectively, which are affixed to the frames 26 and 27, respectively, to the left of their central cross sections. The members 31 and 32 carry posts 36 and 37, respectively, which are to the right of the central cross section of the frame. To the right of such central cross section on these frames are pins 41 and 42, respectively, to which rods 43 and 44, respectively, are pivoted. Rod 43 extends through a hole in the post 36 and can be clamped therein by a screw 46. Rod 44 extends through a hole in the post 37 and can be clamped therein by a screw 47.

A stiffening plate 48 is attached to the leg 14, and a similar plate 49 is attached to the leg 16, these being attached at the points of greatest stress. They have perforations 51 and 52 so that a spreader bar 53 can be attached to them by pins or bolts 54 to maintain the legs 14 and 16 at the proper angle to each other. Spreader bars of different lengths are to be used, depending on the dimensions of the harrow sets used.

A connecting means 56 connects the rear frames 26 and 27 together flexibly so that either can tilt or rise bodily vertically without necessarily tilting or raising the other and also enables horizontal pivotal movement between the frames 26 and 27. This connecting means is shown in detail in Figs. 3 and 4. It comprises members 57 and 58, attached by welds 60 and 61 (or by other suitable means), to the rear sides of the frames 26 and 27, respectively. One of these members carries an eye 62 which is elongated vertically, and the other carries a roller 63 which can ride up and down within the eye and forms a hinge connection between the frames 26 and 27 to allow horizontal pivotal movement therebetween. Flexibility of the connection which enables both vertical and horizontal relative movements between the frames 26 and 27 is important in the present invention.

In use during harrowing, the sets of harrows are in the positions shown in Fig. 1, with the drawbar 12 pulling in the direction of the arrow 64. The sets 28 and 29 travel along paths which are side by side, as do the sets 26 and 27. The sets 28 and 29 are not connected to each other and each can rise when this is caused by the condition of the ground, and it can rise without the one beside it rising. The same is true of the side-by-side sets 26 and 27, even though they are connected together by the connection 56, because of its nature. With the sets arranged, as shown in Fig. 1, only left turns can be made and disk plowing of the field must be counterclockwise. This, however, is no substantial disadvantage, since either direction is as good as the other.

For merely moving the sets of harrows, without harrowing, to another place, as to another field, or to or from a storage place, turns in either direction may be required. The fastening means 46 and 47 are loosened, and the tractor is backed up which causes the sets to take the positions shown in Fig. 2. If the fastening means 46 and 47 are then tightened, the tractor can then proceed forwardly or rearwardly and make either right or left turns, all with the sets in the positions shown in Fig. 2, without the necessity of using a steering arm.

It is preferable that tubular metal be used for the various parts, wherever expedient.

While certain details have been referred to or illustrated for the purpose of explaining the invention, some of them can be added to, changed, or omitted without departing from the spirit of the invention, of which the scope is defined in the appended claims.

We claim:

1. The combination with a squadron harrow comprising a pair of offset harrows each composed of front and rear gangs, of a hitch structure for the squadron harrow comprising a first member, one end of which is arranged to be attached to a tractor and the other end of which is pivotally connected to one of the front gangs at a point substantially midway of the length of said front gang and on a leading edge thereof, said first member having a short stem and an elongated integral leg extending at an angle with respect to said stem, a second member, one end of said second member being pivotally connected to said first member substantially at the angle formed by said stem and said leg and the other end of said second member being pivotally connected to the other of the front gangs at a point substantially midway of the length of said front gang and on a leading edge thereof, first means for holding said first member and said second member at substantially a fixed angle in a horizontal plane with respect to each other but permitting lifting of the one member with respect to the other, second means pivotally connecting each of said rear gangs with its front gang, said second means being offset laterally from the midsections of said gangs, and third means pivotally connecting said rear gangs together.

2. The combination with a squadron harrow comprising a pair of offset harrows each composed of front and rear gangs, of a hitch structure for the squadron harrow comprising a first member, one end of which is arranged to be attached to a tractor and the other end of which is pivotally connected to one of the front gangs at a point substantially midway of the length of said front gang and on a leading edge thereof, said first member having a short stem and an elongated integral leg extending at an angle with respect to said stem, a second member, one end of said second member being pivotally connected to said first member substantially at the angle formed by said stem and said leg and the other end of said second member being pivotally connected to the other of the front gangs at a point substantially midway of the length of said front gang and on a leading edge thereof, first means for holding said first member and said second member at substantially a fixed angle in a horizontal plane with respect to each other but permitting lifting of the one member with respect to the other, said first means being adjustable to a plurality of positions to adjust the distance between the centers of said pair of offset harrows to accommodate harrows of different lengths.

3. The combination with a squadron harrow comprising a pair of offset harrows each composed of front and rear gangs, of a hitch structure for the squadron harrow comprising a first member, one end of which is arranged to be attached to a tractor and the other end of which is pivotally connected to one of the front gangs at a point substantially midway of the length of said front gang and on a leading edge thereof, said first member having a short stem and an elongated integral leg extending at an angle with respect to said stem, a second member, one end of said second member being pivotally connected to said first member substantially at the angle formed by said stem and said leg and the other end of said second member being pivotally connected to the other of the front gangs at a point substantially midway of the length of said front gang and on a leading edge thereof, first means for holding said first member and said second member at substantially a fixed angle in a horizontal plane with respect to each other but permitting lifting of the one member with respect to the other, second means pivotally connecting each of said rear gangs with its front gang, said second means being offset laterally from the midsections of said gangs, third means pivotally connecting said rear gangs together, and fourth means pivotally connecting each of said rear gangs with its front gang, said fourth means being offset laterally from the midsections of said gangs in a direction opposite to that of said second means and being adjustable in length to adjust the angle between said front gangs and said rear gangs.

ALDO E. BACCEI.
GUIDO F. BACCEI.

REFERENCES CITED

The following references are of record in the file of this patent:

UNITED STATES PATENTS

| Number | Name | Date |
|---|---|---|
| 199,287 | Haas | Jan. 15, 1878 |
| 226,448 | Fuller | Apr. 13, 1880 |
| 1,187,251 | Bultman | June 13, 1916 |
| 1,505,196 | Hansen | Aug. 19, 1924 |
| 1,775,269 | Barker | Sept. 9, 1930 |
| 2,221,461 | Sjogren et al. | Nov. 12, 1940 |
| 2,349,852 | Dyrr | May 30, 1944 |